US007416117B1

(12) United States Patent
Morrison

(10) Patent No.: US 7,416,117 B1
(45) Date of Patent: Aug. 26, 2008

(54) METHOD AND APPARATUS FOR DETERMINING IF A USER WALKS AWAY FROM A SELF-SERVICE CHECKOUT TERMINAL DURING OPERATION THEREOF

(75) Inventor: James Morrison, Suwanee, GA (US)

(73) Assignee: NCR Corporation, Dayton, OH (US)

( * ) Notice: Subject to any disclaimer, the term of this patent is extended or adjusted under 35 U.S.C. 154(b) by 646 days.

(21) Appl. No.: 09/217,542

(22) Filed: Dec. 21, 1998

(51) Int. Cl.
*G06K 15/00* (2006.01)
*A63F 9/02* (2006.01)

(52) U.S. Cl. .......................... 235/383; 186/61
(58) Field of Classification Search .................. 705/16, 705/23, 14, 21; 235/383; 186/61
See application file for complete search history.

(56) References Cited

U.S. PATENT DOCUMENTS

| 3,878,365 | A | | 4/1975 | Schwartz et al. | |
|---|---|---|---|---|---|
| 3,919,704 | A | * | 11/1975 | Williams et al. | 340/572.7 |
| 4,206,450 | A | * | 6/1980 | Harden et al. | 340/521 |
| 4,630,110 | A | * | 12/1986 | Cotton et al. | 358/108 |
| 4,654,546 | A | | 3/1987 | Kirjavainen | 307/400 |
| 5,083,638 | A | | 1/1992 | Schneider et al. | |
| 5,710,540 | A | | 1/1998 | Clement et al. | |
| 6,047,262 | A | * | 4/2000 | Lutz | 705/16 |
| 6,049,281 | A | * | 4/2000 | Osterweil | 340/573.4 |
| 6,056,087 | A | * | 5/2000 | Addy et al. | 235/383 |
| 6,098,879 | A | * | 8/2000 | Terranova | 235/384 |
| 6,167,381 | A | * | 12/2000 | Swaine et al. | 705/17 |

FOREIGN PATENT DOCUMENTS

| DE | 19529456 C1 | 10/1996 |
|---|---|---|
| EP | 0847032 A | 6/1998 |
| EP | 0905658 A | 3/1999 |
| GB | 0811958 A2 * | 10/1997 |

OTHER PUBLICATIONS

Anonymous, NCR: NCR heralds "The Year of data warehousing" at CeBIT 98 NCR stand 4c4, hall 1, Mar. 13, 1998, M2 Communications.*
Anonymous, NCR Adds Focus on OEM Agreements for Retail Market, Aug. 3, 1998, PR Newswire.*
Business Week, *Developments to Watch*, by Neil Gross, Dec. 8, 1997.
"Ultrasonic Switch/Alarm for POS Systems", IBM Technical Disclosure Bulletin, IBM Corp., vol. 25, No. 11A, Apr. 1983, p. 5394.

* cited by examiner

*Primary Examiner*—Eric W. Stamber
*Assistant Examiner*—Daniel Lastra
(74) *Attorney, Agent, or Firm*—Maginot, Moore & Beck LLP; Paul W. Martin

(57) ABSTRACT

A method of operating a self-service checkout terminal located in a checkout area of a retail store includes the step of generating a payment-tendered control signal when a user of the self-service checkout terminal tenders payment for a number of items for purchase. The method also includes the step of detecting movement of the user on a movement detection floor mat and generating a walk-away control signal if the user exits the checkout area of the retail store. Moreover, the method includes the step of generating a personnel-request control signal if the walk-away control signal is generated prior to generation of the payment-tendered control signal. A self-service checkout terminal is also disclosed.

12 Claims, 6 Drawing Sheets

METHOD AND APPARATUS FOR DETERMINING IF A USER WALKS AWAY FROM A SELF-SERVICE CHECKOUT TERMINAL DURING OPERATION THEREOF

TECHNICAL FIELD OF THE INVENTION

The present invention relates generally to a self-service checkout terminal, and more particularly to a method and apparatus for determining if a user walks away from a self-service checkout terminal during operation thereof.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if equipped, or at a central payment area which is staffed by a store employee. Thus, a self-service checkout terminal permits a customer to select, itemize, and in some cases pay for his or her purchase without the assistance of the retailer's personnel.

A customer typically has little or no training in the operation of a self-service checkout terminal prior to his or her initial use of the checkout terminal. One concern that retailers have when evaluating a self-service checkout terminal is the level of supervision provided to inexperienced customers. Moreover, it is also known that some customers may have improper intentions when using a self-service checkout terminal. In traditional checkout systems, the clerk employed by the retailer to operate the checkout terminal provides a level of security against theft or other improprieties. However, in the case of a self-service checkout terminal, the terminal itself must provide the necessary security.

One security concern which is particularly important to retailers is the situation in which a customer attempts to walk away from the self-service checkout terminal (presumably with a number of items) prior to tendering payment for his or her items for purchase. In traditional checkout systems, the clerk employed by the retailer to operate the checkout terminal monitors or otherwise ensures that the customer pays for his or her items for purchase prior to walking away from the checkout terminal. However, in the case of a self-service checkout terminal, the terminal itself must provide security against such "walk away" improprieties by the customer.

It should also be appreciated that in certain circumstances the customer is not attempting to commit an impropriety such as theft merely because he or she walked away from the checkout terminal prior to tendering payment for his or her items for purchase. For example, prior to tendering payment, the customer may realize that he or she forgot an item that he or she desired to purchase and may therefore return to the shopping area of the store to retrieve the item before completing the transaction. Moreover, during operation of the checkout terminal, the customer may walk away from the checkout terminal to have a conversation with a store employee, friend, or the like with the intent to return to the checkout terminal to complete his or her checkout transaction.

What is needed therefore is an apparatus and method for operating a self-service checkout terminal which overcomes one or more of the above-mentioned drawbacks. What is particularly needed is a method and apparatus for determining if a user walks away from a self-service checkout terminal during operation thereof with an intent to commit an impropriety such as theft.

SUMMARY OF THE INVENTION

In accordance with a first embodiment of the present invention, there is provided a method of operating a self-service checkout terminal located in a checkout area of a retail store. The method includes the step of generating a payment-tendered control signal when a user of the self-service checkout terminal tenders payment for a number of items for purchase. The method also includes the step of detecting if the user exits the checkout area of the retail store and generating a walk-away control signal in response thereto. Moreover, the method includes the step of generating a personnel-request control signal if the walk-away control signal is generated prior to generation of the payment-tendered control signal.

In accordance with a second embodiment of the present invention, there is provided a method of operating a self-service checkout terminal located in a checkout area of a retail store. The method includes the step of generating a payment-tendered control signal when a user of the self-service checkout terminal tenders payment for a number of items for purchase. The method also includes the step of detecting movement of the user on a movement detection floor mat and generating a walk-away control signal if the movement of the user is indicative of an attempt by the user to exit the checkout area of the retail store. Moreover, the method includes the step of generating a personnel-request control signal if the walk-away control signal is generated prior to generation of the payment-tendered control signal.

In accordance with a third embodiment of the present invention, there is provided a self-service checkout terminal. The terminal includes a movement detecting device for detecting movement of a user thereon. The terminal also includes a processing unit electrically coupled to the movement detecting device. Moreover, the terminal includes a memory device electrically coupled to the processing unit. The memory device has stored therein a plurality of instructions which, when executed by the processing unit, causes the processing unit to (a) generate a payment-tendered control signal when the user of the self-service checkout terminal tenders payment for a number of items for purchase, (b) detect if the user exits the checkout area of the retail store with the movement detecting device and generate a walk-away control signal in response thereto, and (c) generate a personnel-request control signal if the walk-away control signal is generated prior to generation of the payment-tendered control signal.

It is therefore an object of the present invention to provide a new and useful method and apparatus of operating a self-service checkout terminal.

It is moreover an object of the present invention to provide an improved method and apparatus for operating a self-service checkout terminal.

It is yet further an object of the present invention to provide a method and apparatus for determining if a user walks away from a self-service checkout terminal during operation thereof with an intent to commit an impropriety such as theft.

The above and other objects, features, and advantages of the present invention will become apparent from the following description and the attached drawings.

DETAILED DESCRIPTION OF THE INVENTION

Figure 1:
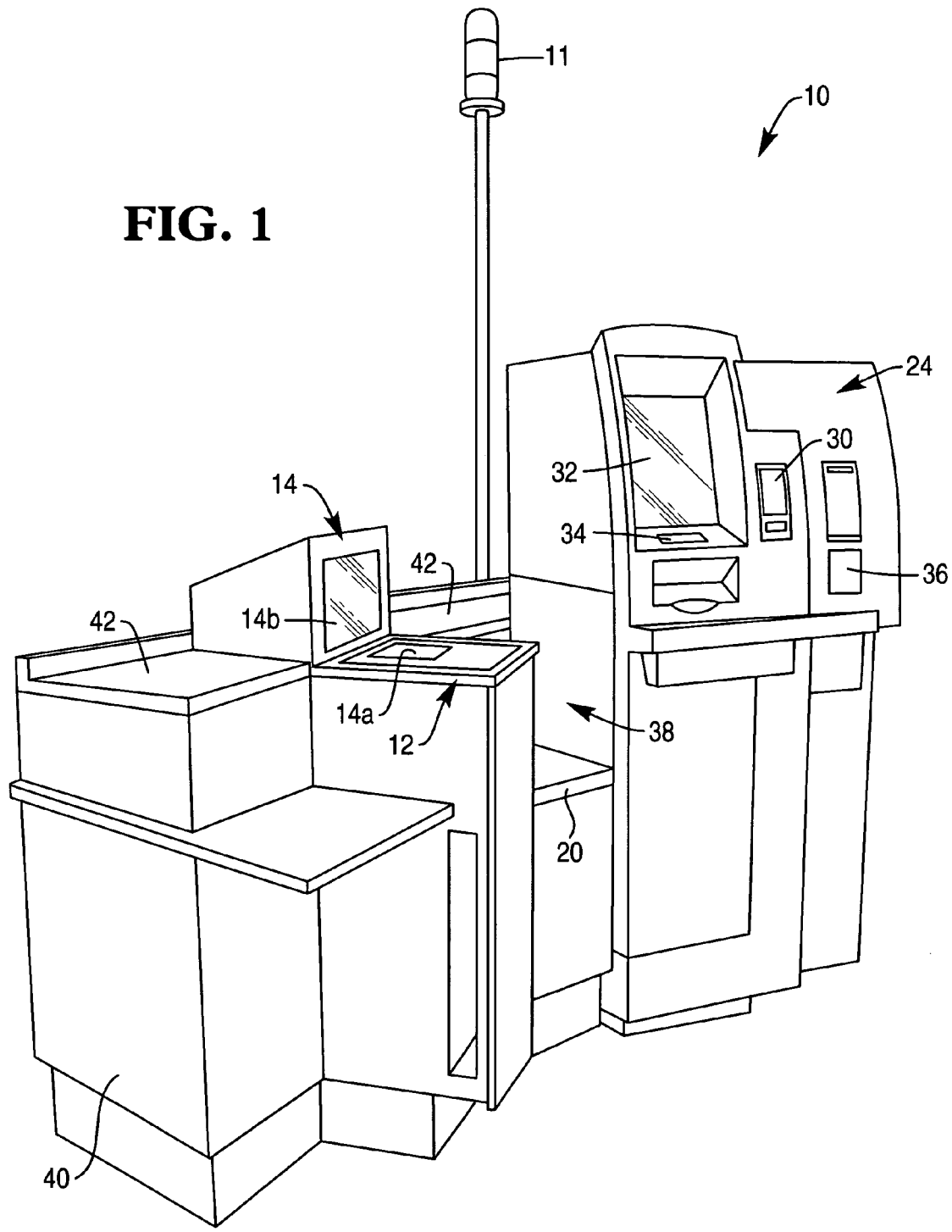
FIG. 1 is a perspective view of a self-service checkout terminal which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
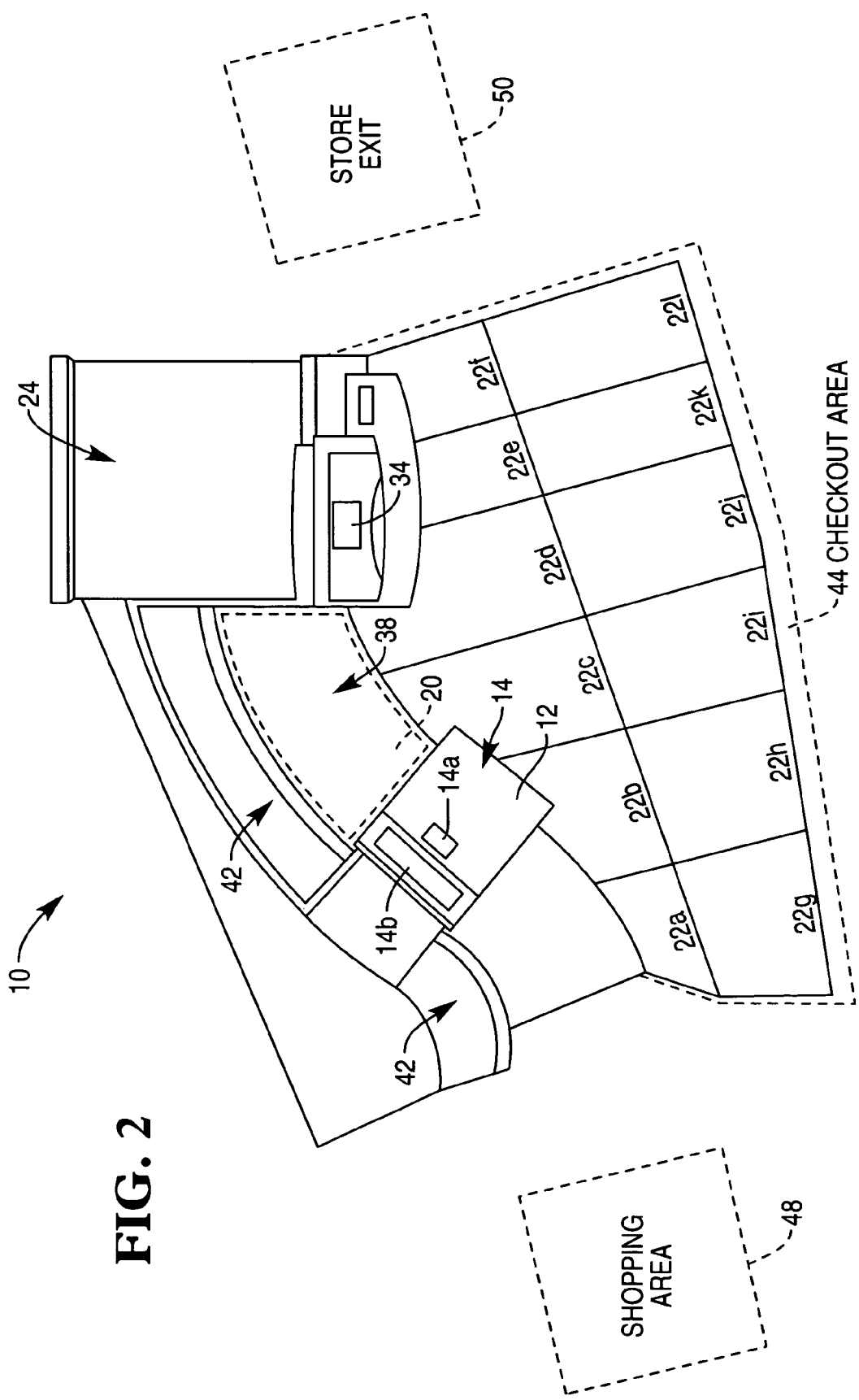
FIG. 2 is a plan view of the self-service checkout terminal of FIG. 1.

Referring now to FIGS. 1 and 2, there is shown a retail terminal such as a self-service checkout terminal 10 for use in a retail business such as a grocery store. For purposes of the following discussion, the self-service checkout terminal 10 will be described in detail; however, it should be appreciated that numerous other types of retail terminals may also utilize the hereinafter described aspects of the present invention. For example, an automated teller machine (ATM) or an information terminal such as a kiosk may also be configured to utilize the hereinafter described aspects of the present invention.

The self-service checkout terminal 10 includes a summoning device such as a status light device 11, a product scale 12, a scanner 14, a bagwell scale 20, a movement detecting device such as a movement detection floor mat 22, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags (not shown) and a base 40 having a counter 42 secured thereto. The counter 42 defines an arcuate surface as shown in FIG. 2. Such an arcuate surface allows the scanner 14 to be positioned relatively close or otherwise proximate the ATM 24 and hence the components associated therewith. Such a configuration facilitates a user's (e.g. customer's) use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 1. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item) in the manner described below.

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by a customer.

The status light device 11 is provided in order to notify store personnel, such as a customer service manager, if intervention into the customer's transaction is needed. In particular, the status light device 11 may display a first colored (e.g. yellow) light in order to notify store personnel that intervention is needed prior to the end of the customer's transaction. Alternatively, the status light device 11 may display a second colored (e.g. red) light in order to notify store personnel that intervention is needed immediately.

The bagwell scale 20 is a weight scale which monitors the weight of items placed in the bagwell 38 (i.e. into a grocery bag) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the bagwell scale 20 may be utilized to monitor the ingress and egress of items into and out of the bagwell 38 along with onto and off of the counter 42. Such monitoring is particularly useful for preventing items which have not been scanned from being placed into a grocery bag.

The movement detection floor mat 22 is provided to track movement of a customer within a checkout area 44 of the retail store. What is meant herein by the term "checkout area" is the area around the self-service checkout terminal 10 in which the customer moves about during operation of the terminal 10 to enter and bag items and thereafter tender payment for the same. For example, as shown in FIG. 2, the checkout area 44 may be defined as the area within the phantom lines around the self-service checkout terminal 10. As shall be discussed below in more detail, the movement detection floor mat 22 is capable of detecting directional movement of the customer within the checkout area 44. Such detection capability is distinguished from a simple motion sensor in that the movement detection floor mat 22 is capable of determining direction of travel along with monitoring movement throughout substantially all of the checkout area 44, not simply the area immediately in front of the terminal 10 as would be the case with a simple motion sensor.

The movement detection floor mat 22 is preferably constructed of a thin polypropylene laminate that is positioned on or under the carpeting or floor tiles of the store. The laminate is approximately 0.002 inches thick and includes tiny "pillows" of foamed plastic. These pillows function as an electret which is a type of electromagnet used, for example, in certain microphones. When a weak electrical current is applied across the top of the laminate, the foamed plastic pillows respond to slight or otherwise minute changes in pressure by generating an electrical output signal. Such movement detection floor mats 22 have been found to be able to detect the breathing of a person laying on the floor. One such movement detection floor mat which is suitable for use as the movement detection floor mat 22 of the present invention is commercially available from Messet Oy Company of Kuopio, Finland, certain aspects of which are disclosed in U.S. Pat. No. 4,654,546, the disclosure of which is hereby incorporated by reference.

Hence, as shown in FIG. 2, the movement detection floor mat 22 may divided into a number of detection zones 22a-22l. Movement into an out of each of the detection zones 22a-22l may be utilized to track movement of a customer within the checkout area 44 of the store. In particular, the movement detection floor mat 22 generates ordered output signals indicative of which detection zone 22a-22l is being stepped on by the customer operating the self-service checkout terminal 10. It should be appreciated that the size, shape, and number of the detection zones 22a-22l may be altered to fit the needs of a given checkout area 44 or terminal 10. Moreover, it should be appreciated that a number of smaller, separate movement detection floor mats 22 may be utilized in lieu of a larger, single movement detection floor mats 22 divided into the detection zones 22a-22l, if so desired.

Figure 3:
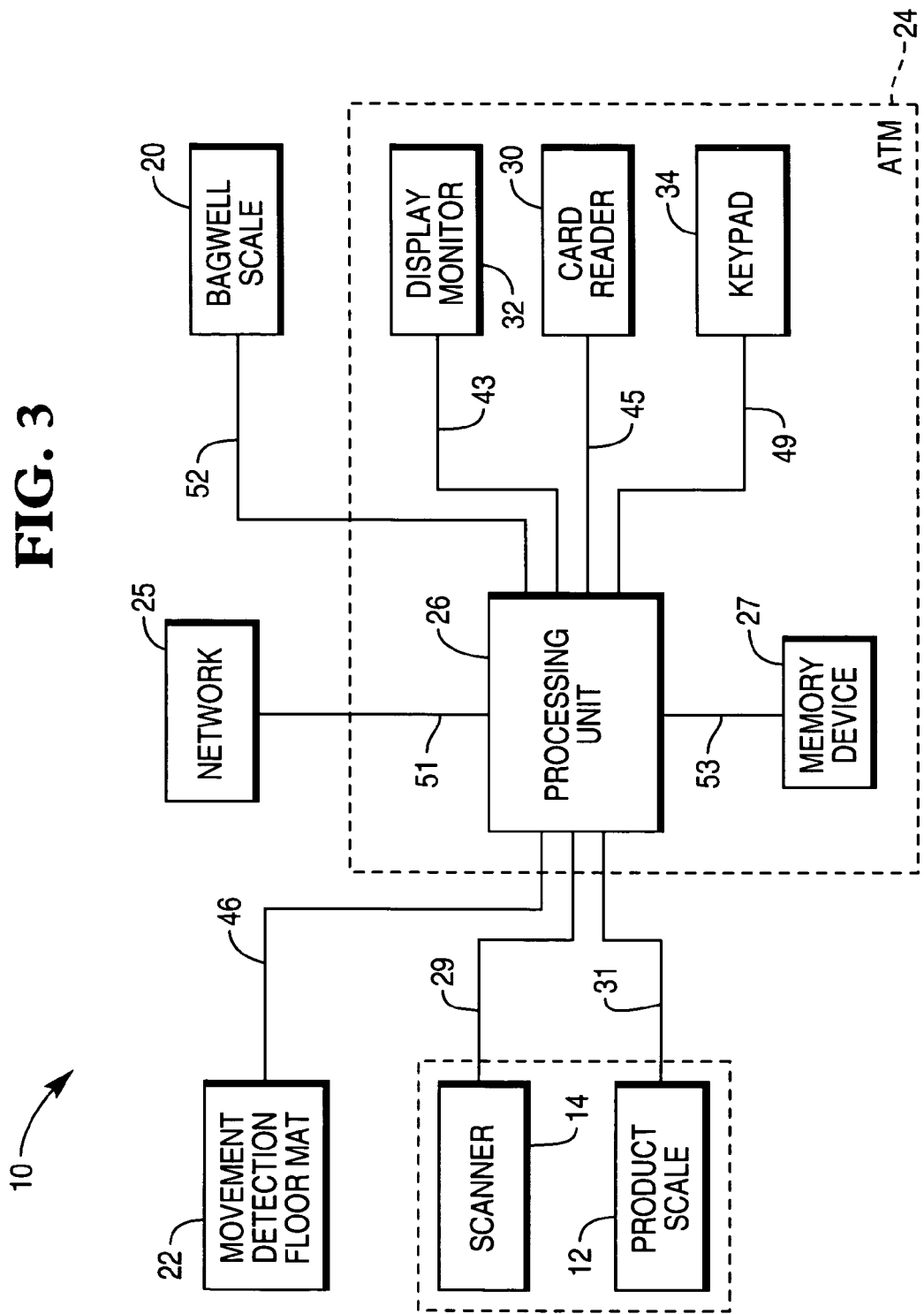
FIG. 3 is a simplified block diagram of the self-service checkout terminal of FIG. 1.

Referring now to FIG. 3, there is shown a simplified block diagram of the self-service checkout terminal 10. The processing unit 26 is electrically coupled to the product scale 12, the scanner 14, the bagwell scale 20, the movement detection floor mat 22, the card reader 30, the display monitor 32, and the keypad 34. The processing unit 26 is also electrically coupled to a network 25 and a memory device 27.

The processing unit 26 monitors output signals generated by the scanner 14 via a communication line 29. In particular, when the customer scans an item which includes a product identification code across the scanning windows 14a, 14b, an output signal indicative of the product identification code is generated on the communication line 29.

The processing unit 26 is coupled to the product scale 12 via a data communication line 31. In particular, when a customer places an item on the product scale 12, the product scale 12 generates an output signal on the data communication line 31 indicative of the weight of the item.

The processing unit 26 is coupled to the bagwell scale 20 via a data communication line 52. In particular, when a customer places an item into a grocery bag or onto the portion of the counter 42 proximate the bagwell 38, the bagwell scale 20 generates an output signal on the data communication line 52 indicative of the weight of the items in the grocery bags and on the portion of the counter 42 proximate the bagwell 20.

The processing unit 26 communicates with the display monitor 32 through a data communication line 43. The processing unit 26 generates output signals on the data communication line 43 which cause various instructional messages to be displayed on the display monitor 32. As alluded to above, the display monitor 32 may include known touch screen technology which can generate output signals when the customer touches a particular area of the display screen associated with the display monitor 32. The signals generated by the display monitor 32 are transmitted to the processing unit 26 via the data communication line 43. It should be appreciated that the various instructional messages may also be communicated via other devices in addition to or in lieu of the display monitor 32. For example, instructional messages may be generated with a voice generating device (not shown) or an audible tone generating device (not shown).

The keypad 34 is coupled to the processing unit 26 through a data communication line 49. The keypad 34 may include one or more of a known keypad or a touch pad. It should be appreciated that the touch screen associated with the display monitor 32 and the keypad 34 define input devices which may be utilized by a customer to input information associated with operation of the self-service checkout terminal 10.

Moreover, the card reader 30 is coupled to the processing unit through a data communication line 45. The card reader 30 may include a known credit, debit, loyalty, and/or smart card reader which is capable of reading information stored on the customer's card.

Figure 4:
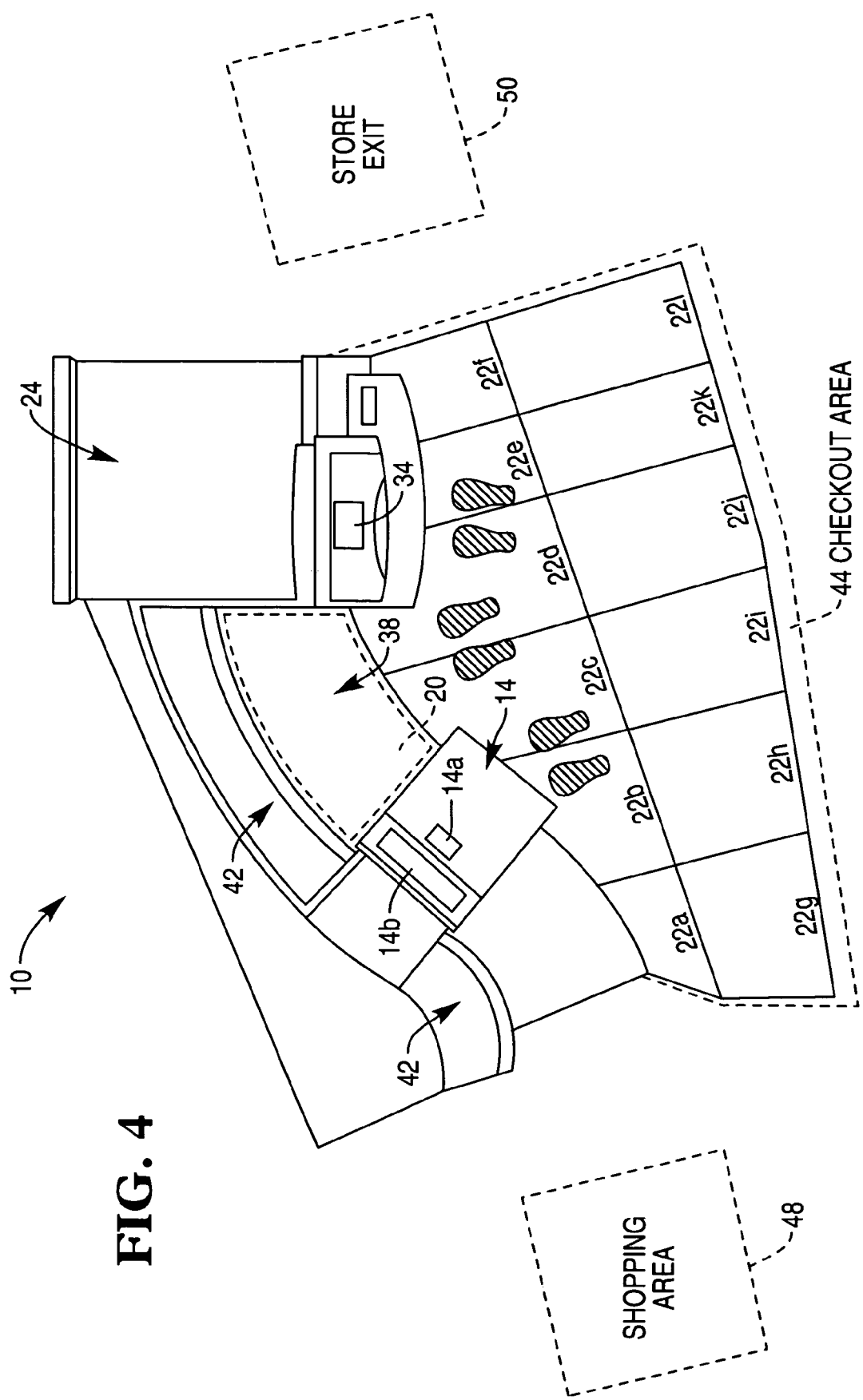
FIG. 4 is a plan view of the self-service checkout terminal of FIG. 1 which illustrates movement of the customer within the checkout area of the store.

The movement detection floor mat 22 is coupled to the processing unit 26 via a data communication line 46. The movement detection floor mat 22 generates output signals on the data communication line 46 indicative of the customer's movement within the checkout area 44 of the retailer's store. It should be appreciated that the processing unit 26 receives such output signals from the movement detection floor mat 22 and determines a motion pattern associated with the customer's movement (i.e. in which direction the customer is walking and if the customer stays within the checkout area 44). For example, as shown in FIG. 4, if the customer moves between the scanner 14, the bagwell 38, and the ATM 24 during operation of the self-service checkout terminal 10, the movement detection floor mat 22 generates ordered output signals indicative of movement, for example, in the detection zones 22b, 22c, 22d, and 22e.

Figure 5:
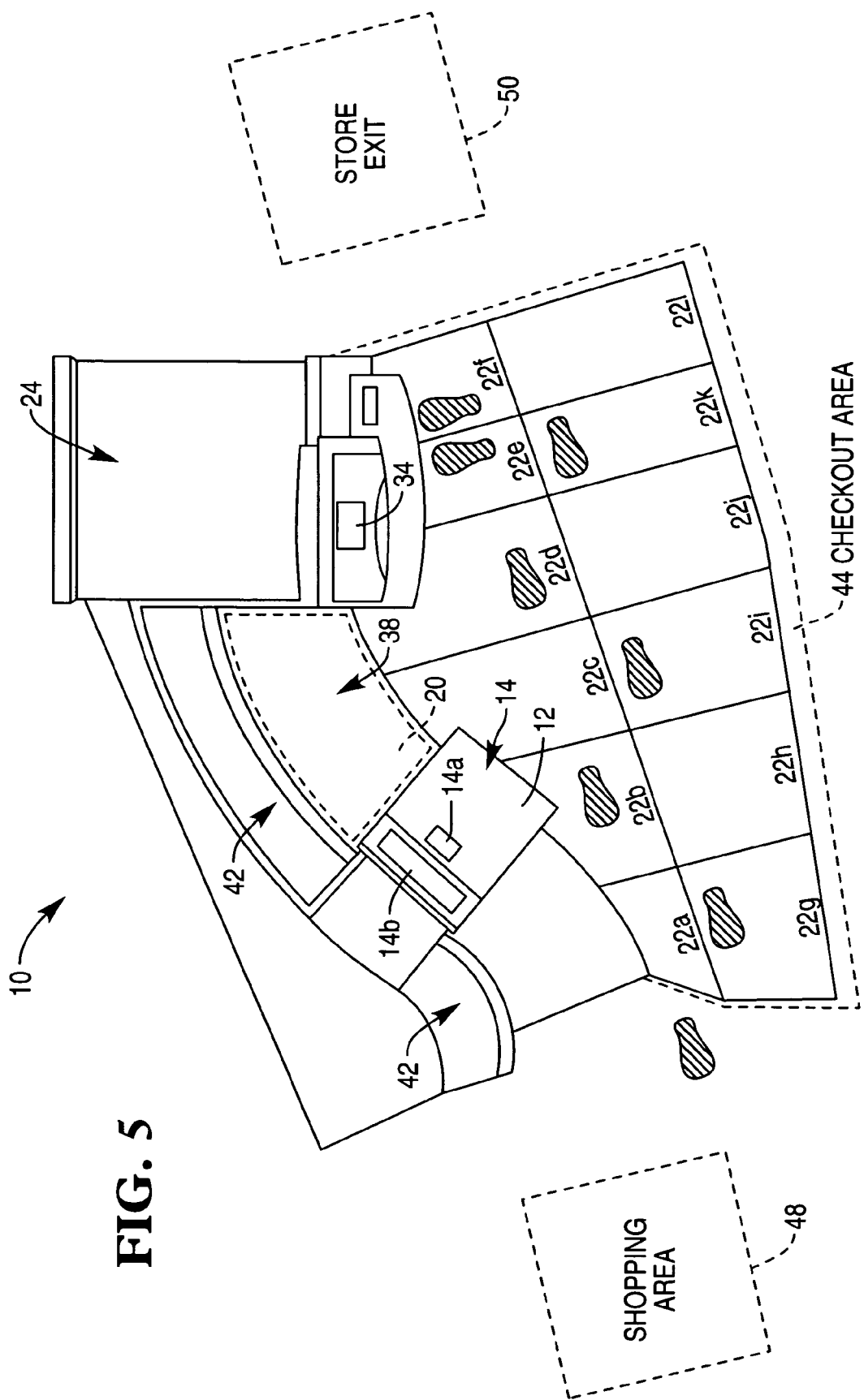
FIG. 5 is a view similar to FIG. 4, but illustrating movement of the customer from the checkout area of the store to the shopping area of the store.

In addition, as shown in FIG. 5, if the customer walks away from the self-service checkout terminal 10 so as to return to a shopping area 48 of the retailer's store, the movement detection floor mat 22 generates ordered output signals indicative of movement, for example, in the detection zones 22e, 22f, 22k, 22d, 22i, 22b, and 22g. Subsequent to such movement detection, the movement detection floor mat 22 does not generate further output signals since the customer is not standing or otherwise positioned in the checkout area 44 (i.e.

on the movement detection floor mat 22). What is meant herein by the term "shopping area" is the area of the retail store containing shelves and the like where the customer typically selects his or her items for purchase. Hence, during a typical visit to the retailer's store, the customer selects his or her items for purchase from the shopping area 48 of the store and thereafter advances to the checkout area 44 of the store so as to checkout his or her items for purchase with the self-service checkout terminal 10.

Figure 6:
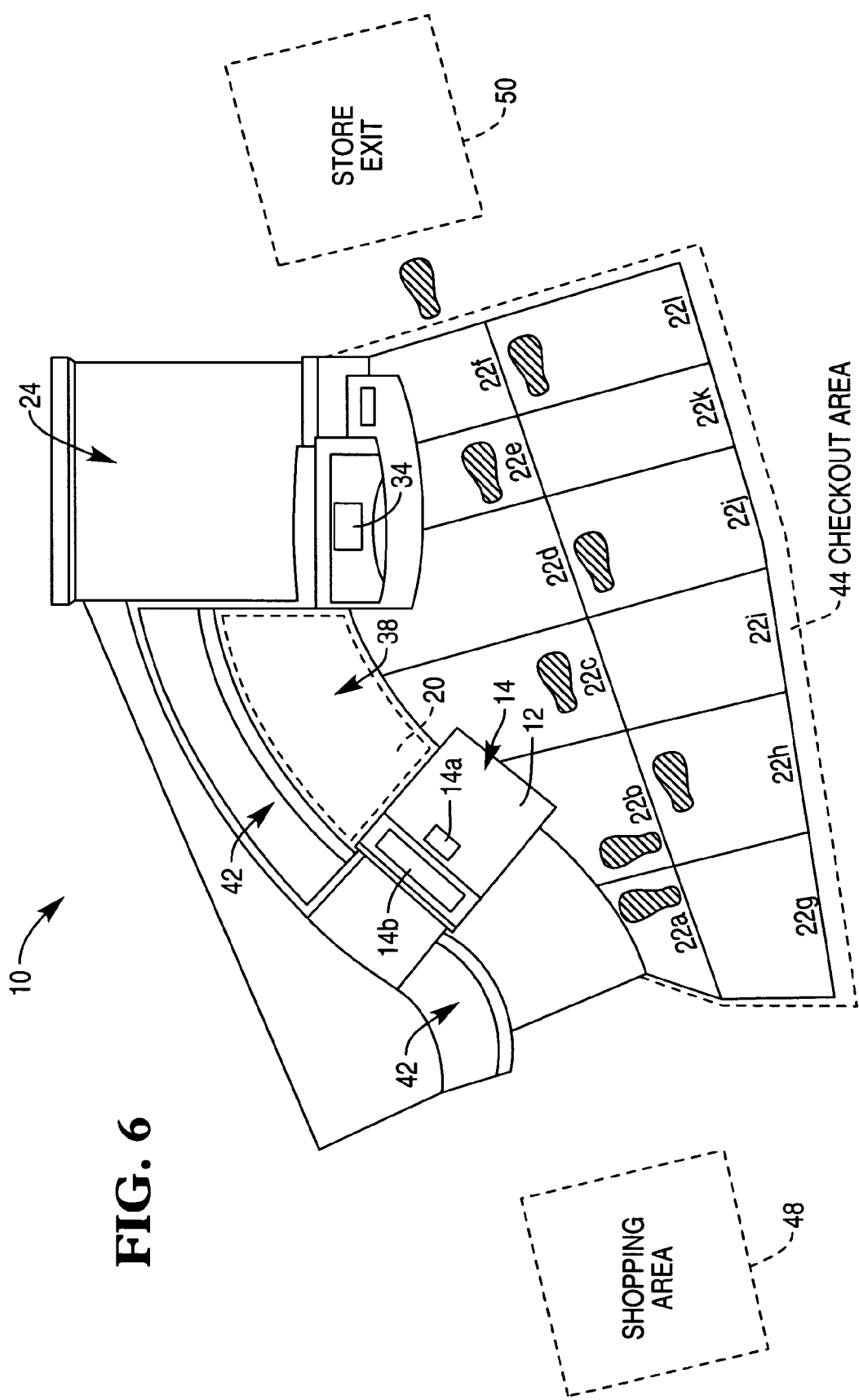
FIG. 6 is a view similar to FIG. 4, but illustrating movement of the customer from the checkout area of the store to the exit of the store.

Moreover, as shown in FIG. 6, if the customer walks away from the self-service checkout terminal 10 so as to exit the store through a store exit 50, the movement detection floor mat 22 generates ordered output signals indicative of movement, for example, in the detection zones 22a, 22b, 22h, 22c, 22j, 22e, and 22l. Subsequent to such movement detection, the movement detection floor mat 22 does not generate further output signals since the customer is not standing or otherwise positioned in the checkout area 44 (i.e. on the movement detection floor mat 22). It should be appreciated that such movement toward the store exit 50 is typically performed only after the customer has tendered payment for his or her items for purchase. In particular, as discussed below in greater detail, if the customer makes an attempt to exit the retail store prior to tendering payment for his or her items for purchase, the processing unit 26 concludes that the customer may be attempting to commit an impropriety such as theft.

The processing unit 26 includes network interface circuitry (not shown) which conventionally permits the self-service checkout terminal 10 to communicate with the retailer's network 25 such as a LAN or WAN through a wired connection 51. The processing unit 26 communicates with the retailer's network 25 during the checkout procedure in order to obtain information, such as pricing information, associated with an item being scanned or otherwise entered, and also to verify customer credit approval when appropriate. The network interface circuitry associated with the self-service checkout terminal 10 may include a known Ethernet expansion card, and the wired connection 51 may include a known twisted-pair communication line. Alternatively, the network interface circuitry may support wireless communications with the retailer's network 25.

The processing unit 26 communicates with the memory device 27 via a data communication line 53. The memory device 27 is provided to maintain an electronic transaction table which includes a record of the product information associated with each item that is scanned, weighed, or otherwise entered during the customer's use of the self-service checkout terminal 10. For example, if the customer scans a can of soup, the description of the soup and the pricing information associated therewith is recorded in the transaction table in the memory device 27. Similarly, if the customer weighs a watermelon with the product scale 12 and then enters a product lookup code associated with watermelon via the data input device 34, product information associated with the watermelon is recorded in the transaction table.

It should therefore be appreciated that the sum of each of the items recorded in the transaction table (1) minus any reductions (e.g. coupons), and (2) plus any applicable taxes is the amount that the customer pays for his or her transaction. Moreover, data stored in the transaction table is printed out on the printer 36 thereby generating a receipt for the customer at the end of his or her transaction.

In operation, after the customer has selected his or her items for purchase from the shopping area 48 of the retailer's store, the customer advances to the checkout area 44 of the store so as to checkout his or her items for purchase with the self-service checkout terminal 10. The customer then initializes the self-service checkout terminal 10 and commences to scan his or her items for purchase with the scanner 14 or otherwise enter his or her items into the terminal 10. Once the customer has entered the last of his or her items for purchase, the processing unit 26 causes a message to be displayed in the display monitor 32 which instructs the customer to tender payment for his or her items for purchase by either inserting cash into a currency acceptor (not shown) or by inserting a debit, credit, or smart card into the card reader 30. It should be appreciated that in the case of when the customer inserts cash into the currency acceptor, change may be returned to the customer by a currency dispenser (not shown) and a coin dispenser (not shown). If the customer properly tenders payment for his or her items for purchase, a payment-tendered control signal is generated thereby causing the retail checkout transaction to end.

During such a retail checkout transaction, the movement detection floor mat 22 is utilized to monitor the customer's movement both within and into and out of the checkout area 44. If the customer exits the checkout area 44 of the retail store, the processing unit 26 generates a walk-away control signal which is utilized to determine if the customer is attempting to commit an impropriety such as theft. In particular, if the customer walks away from (i.e. exits) the checkout area 44 of the store prior to tendering payment for his or her items for purchase (i.e. the walk-away control signal is generated prior to generation of the payment-tendered control signal), the processing unit 26 generates a personnel-request control signal. In response to generation of the personnel-request control signal, the processing unit 26 operates a summoning device (e.g. the status light device 11 or a paging system) so as to summon retail personnel such as the customer service manager to investigate the walk away situation. It should be appreciated that, as described below, certain walk away situations are deemed less of a security risk relative to other walk away situations.

For example, as shown in FIG. 5, if the customer walks away from the self-service checkout terminal 10 so as to return to the shopping area 48 of the retailer's store, the movement detection floor mat 22 generates ordered output signals indicative of movement, for example, in the detection zones 22e, 22f, 22k, 22d, 22i, 22b, and 22g. Receipt of such ordered output signals causes the processing unit 26 to generate a first type of walk-away control signal such as a return-to-shopping control signal. If the customer then later returns to the shopping area 44 (i.e. the movement detection floor mat 22 detects presence of the customer), a return-to-terminal control signal is generated. Upon generation of the return-to-terminal control signal, the processing unit 26 concludes that the customer was not attempting to commit an impropriety such as theft and therefore causes the self-service checkout terminal 10 to be operated so as to allow the customer to continue his or her retail checkout transaction. More particularly, since the customer exited the checkout area 44 so as to return to the shopping area 48 of the store and thereafter returned to the checkout area 44, the processing unit 26 concludes that the customer merely returned to the shopping area 48 to retrieve a forgotten item. It should be appreciated that if the customer does not return to the checkout area 44 within a predetermined period of time the processing unit 26 may operate the status light device 11 so as to summon retail personnel such that retail personnel may void the abandoned retail checkout transaction.

However, as shown in FIG. 6, if the customer walks away from the self-service checkout terminal 10 so as to exit the store through the store exit 50, the movement detection floor mat 22 generates ordered output signals indicative of movement, for example, in the detection zones 22a, 22b, 22h, 22c, 22j, 22e, and 22l. Receipt of such ordered output signals causes the processing unit 26 to generate a second type of walk-away control signal such as an exiting-store control signal. If the customer exits the checkout area 44 in a direction indicative of an attempt to exit the store prior to tendering payment for his or her items for purchase (i.e. the exiting-store control signal is generated prior to generation of the payment-tendered control signal), a personnel-needed-immediately control signal is generated. Upon generation of the personnel-needed-immediately control signal, the processing unit 26 concludes that the customer may be attempting to commit an impropriety such as theft and therefore operates the summoning device (e.g. the status light device 11 or a paging system) to summon retail personnel in an urgent manner. For example, the status light device 11 may be operated to flash a red signal lamp so as to alert retail personnel that the customer may be exiting the store with items which have not been paid for. Retail personnel may then investigate the customer's transaction in order to determine if the customer was attempting to commit an impropriety such as theft.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

For example, the processing unit 26 may also monitor the rate of movement that the customer exits the checkout area 44. For example, if the customer quickly exits the checkout area 44 in a direction toward the store exit 50 without having first tendered payment for his or her items for purchase, the processing unit 26 may conclude that the customer is running out of the store with items which have not been paid for and therefore generate an alarm to alert retail personnel to the situation.

Moreover, the movement detection floor mat 22 may also be utilized to monitor additional movements other than the movement associated with the user of the self-service checkout terminal 10. For example, the movement detection floor mat 22 may monitor movement of a shopping cart or the like or a person accompanying the user of the terminal 10 (e.g. a child).

What is claimed is:

1. A method of operating a self-service checkout terminal of a retail store, comprising the steps of:
    recording a number of merchandise items for purchase by a user by said self-service checkout terminal;
    receiving movement signals from a plurality of adjoining detection zones of a floor mat in a checkout floor area adjacent to said self-service checkout terminal in response to said detection zones reacting to a weight of said user as said user walks on said detection zones by said self-service checkout terminal;
    tracking directional movements of said user from said movement signals by said self-service checkout terminal as said user walks about said checkout floor area in any direction while using said self-service checkout terminal;
    receiving a last movement signal as said user leaves said checkout floor area indicative of said user ceasing operation of said self-checkout terminal;
    determining if a payment-tendered control signal was received by said self-service checkout terminal indicative of said user having tendered payment for said merchandise items prior to receipt of said last movement signal; and
    if said payment-tendered control signal was not received by said self-service checkout terminal, determining a last direction of movement of said user prior to said user leaving said checkout floor area by said self-service checkout terminal, and operating a summoning device so as to summon retail personnel by said self-service checkout terminal if said last direction of movement was towards an exit of said store.

2. The method of claim 1, wherein said summoning device comprises a status light above said self-service checkout terminal.

3. The method of claim 1, wherein said summoning device comprises a paging system coupled to said self-service checkout terminal.

4. The method of claim 1, further comprising tracking rates of directional movements and operating said summoning device after determining from a final rate that said user is exiting said checkout floor area in haste.

5. The method of claim 1, further comprising:
    determining that said last direction of movement of said user prior to said user leaving said checkout floor area was towards a shopping area by said self-service checkout terminal;
    receiving a new movement signal as said user reenters said checkout floor area; and
    allowing said user to continue a retail transaction in response to receipt of said new movement signal.

6. The method of claim 1, further comprising:
    tracking directional movements of a cart of said user on said floor mat.

7. A self-service checkout system comprising:
    a floor mat including a plurality of adjoining detection zones for producing movement signals in a checkout floor area in response to said detection zones reacting to a weight of said user as said user walks on said detection zones;
    a summoning device; and
    a self-service checkout terminal adjacent to said checkout floor area including a computer for
        recording a number of merchandise items for purchase by said user;
        receiving movement signals from said floor mat;
        tracking directional movements of said user from said movement signals as said user walks about said checkout floor area in any direction while using said self-service checkout terminal;
        receiving a last movement signal as said user leaves said checkout floor area indicative of said user ceasing operation of said self-checkout terminal;
        determining if a payment-tendered control signal was received, indicative of said user having tendered payment for said merchandise items prior to receipt of said last movement signal; and
        if said payment-tendered control signal was not received, determining a last direction of movement of said user prior to said user leaving said checkout floor area, and operating said summoning device so as to summon retail personnel if the last direction of movement was towards an exit of the store.

8. The system of claim 7, wherein said summoning device comprises a status light above said self-service checkout terminal.

9. The system of claim 7, wherein said summoning device comprises a paging system coupled to said self-service checkout terminal.

10. The system of claim 7, wherein the computer is also for tracking rates of directional movements and operating said summoning device after determining from a final rate that said user is exiting said checkout floor area in haste.

11. The system of claim 7, wherein the computer is also for
  determining that said last direction of movement of said user prior to said user leaving said checkout floor area was towards a shopping area;
  receiving a new movement signal as said user reenters said checkout floor area; and
  allowing said user to continue a retail transaction in response to receipt of said new movement signal.

12. The system of claim 7, wherein the computer is also for
  tracking directional movements of a cart of said user on said floor mat.

* * * * *